(12) United States Patent
Bharara

(10) Patent No.: US 9,442,832 B2
(45) Date of Patent: Sep. 13, 2016

(54) USER WORKFLOW REPLICATION FOR EXECUTION ERROR ANALYSIS

(71) Applicant: Aavishkar Bharara, Bangalore (IN)

(72) Inventor: Aavishkar Bharara, Bangalore (IN)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 14/324,895

(22) Filed: Jul. 7, 2014

(65) Prior Publication Data

US 2016/0004629 A1 Jan. 7, 2016

(51) Int. Cl.
*G06F 11/36* (2006.01)
*G06F 11/07* (2006.01)
*G06F 11/26* (2006.01)
*G06F 11/34* (2006.01)

(52) U.S. Cl.
CPC ......... *G06F 11/3692* (2013.01); *G06F 11/079* (2013.01); *G06F 11/0748* (2013.01); *G06F 11/261* (2013.01); *G06F 11/3438* (2013.01)

(58) Field of Classification Search
CPC ............... G06F 11/261; G06F 11/079; G06F 11/3414; G06F 11/3438; G06F 11/3692
See application file for complete search history.

(56) References Cited

U.S. PATENT DOCUMENTS

| | | | |
|---|---|---|---|
| 6,115,690 A | 9/2000 | Wong | |
| 6,934,934 B1* | 8/2005 | Osborne, II | G06F 11/3414 709/224 |
| 7,403,933 B2 | 7/2008 | Arend | |
| 7,418,628 B2 | 8/2008 | Arend | |
| 7,523,447 B1* | 4/2009 | Callahan | G06F 11/3672 717/135 |
| 7,711,676 B2 | 5/2010 | Stuhec | |
| 7,865,442 B1 | 1/2011 | Sowell | |
| 8,069,437 B2 | 11/2011 | Aigner et al. | |
| 8,165,994 B2 | 4/2012 | Carnathan et al. | |
| 2002/0129338 A1* | 9/2002 | MacDonell | G06F 11/3664 717/126 |
| 2005/0278279 A1 | 12/2005 | Petev et al. | |
| 2007/0233448 A1* | 10/2007 | Papaefstathiou | G06F 17/5009 703/15 |
| 2008/0091659 A1 | 4/2008 | McFaul | |
| 2008/0262860 A1* | 10/2008 | Schneider | G06Q 10/10 705/1.1 |
| 2010/0064001 A1 | 3/2010 | Daily | |
| 2010/0174734 A1 | 7/2010 | Norbauer et al. | |
| 2010/0299763 A1 | 11/2010 | Marcus et al. | |
| 2012/0030666 A1 | 2/2012 | Laicher et al. | |
| 2013/0054942 A1 | 2/2013 | Serrano | |
| 2013/0104041 A1* | 4/2013 | Seshagiri | G06F 11/3414 715/704 |
| 2013/0111266 A1* | 5/2013 | Tosaka | G06F 11/366 714/28 |
| 2013/0159993 A1 | 6/2013 | Misovski et al. | |
| 2013/0238795 A1* | 9/2013 | Geffin | G06F 1/206 709/224 |

\* cited by examiner

*Primary Examiner* — Charles Ehne
(74) *Attorney, Agent, or Firm* — Klarquist Sparkman, LLP

(57) ABSTRACT

Examples of workflow replication and execution error analysis are provided herein. Data describing how a user interacts with a software application and describing the context within which the user is working is recorded and provided to a user workflow replication system when an execution error occurs. A simulation of the execution error can be performed by replicating a configuration of the software application and/or the computer system that executed the software application and then performing functions specified in the provided data. The results of the simulation of the execution error can then be analyzed according to a number of scenarios.

21 Claims, 8 Drawing Sheets

USER WORKFLOW REPLICATION FOR EXECUTION ERROR ANALYSIS

BACKGROUND

With the increasing complexity of and reliance upon software applications, especially in a business context, identifying and addressing the causes of software application execution errors is critical. Some conventional approaches involve providing limited error reports to a software producer when an execution error occurs. The software producer may or may not make changes to the software application based on these limited error reports. Such limited error reporting does not typically fully convey the context or supporting information necessary to accurately identify the cause of an execution error or work toward the resolution of the error. A more robust and comprehensive approach is needed that is capable of being applied to complex, modern software applications that are used in a variety of conditions.

DETAILED DESCRIPTION

The examples described herein generally replicate a user workflow. Information representing the way a user or group of users interacts with a software application is useful for several purposes. In conventional systems, software producers typically know very little about how users actually use a particular software application. For example, software producers may receive customer feedback regarding certain features or may receive a limited notification when certain types of errors are encountered. The examples of user workflow replication described herein provide detailed information both about how a user interacts with a software application and about the context within which the user is working. This not only allows a software producer to better diagnose and resolve execution errors but also allows the software producer to improve the software application based on real-world use patterns by, for example, removing unused functionality, simplifying commonly used functionality, or improving the user interface of the software application. Examples are described below with reference to FIGS. 1-8.

Figure 1:
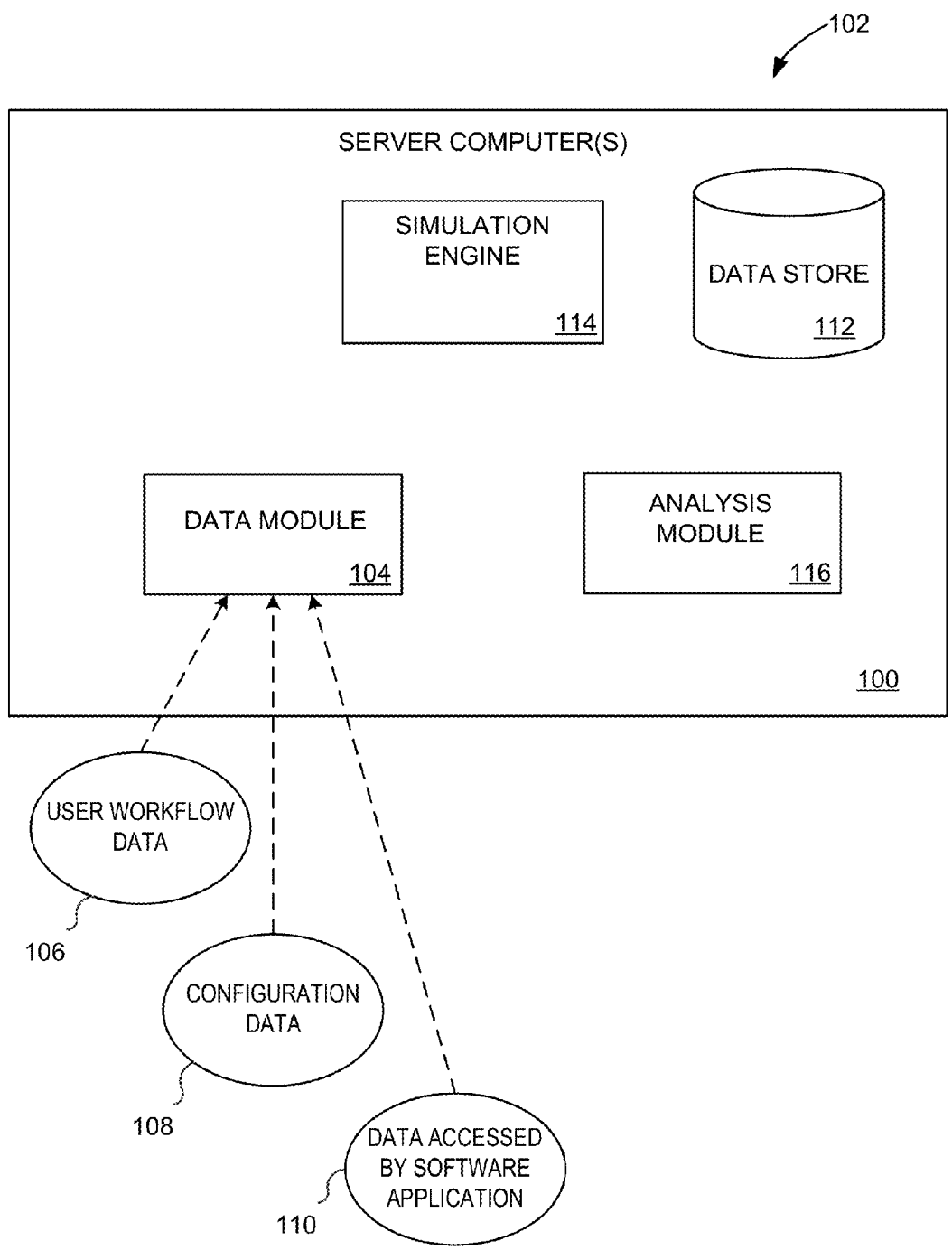
FIG. 1 is an example user workflow replication system.

FIG. 1 illustrates one or more server computers 100 implementing a user workflow replication system 102. System 102 includes a data module 104 that receives data associated with a computer system that has executed a software application. The data can be associated with an execution error in the software application that occurred while the software application was being executed by the computer system. The computer system can be a computer system remote from the one or more server computers 100. For example, the one or more server computers 100 can be a system of a software producer, and the computer system with which the received data is associated can be a computer system of a customer of the software producer, such as a business or individual.

Data module 104 receives one or more of user workflow data 106, configuration data 108, or data 110 accessed by the software application prior to an execution error. User workflow data 106 represents one or more user interactions with the software application executed by the computer system. User workflow data 106 can include a plurality of method calls logged in a call stack of the computer system. The method calls correspond to functions performed by the software application prior to the execution error and are typically logged in a time-ordered sequence. In some examples, as functions are performed by the software application, the corresponding method calls are logged in the call stack. The number of method calls stored in the call stack can vary based on user requirements or preferences. In some examples, logged method calls are periodically copied to another storage location.

User workflow data 106 can also include, for at least one of the logged method calls, an additional method call that called the method call. The method call and the additional method call that called the method call can be, for example, stored in association in the call stack of the computer system or in other storage. User workflow data 106 can alternatively or additionally include a list of user interface interactions. For example, user workflow data 106 can include a reference to icons, options, or menu items selected as well as a previous menu or selection from which the icons, options, or menu items were selected.

Configuration data 108 reflects a configuration or setting of the computer system or software application. Configuration data 108 can include at least one of: a software application customization, a software application version, a software application setting, an operating system support pack version, an operating system version, a hardware configuration of the computer system, or other information. Data 110 accessed by the software application can include copies, modified copies, or descriptions of data that was accessed by the software application prior to or as the execution error occurred. In some examples, data 110 accessed by the software application is stripped of confidential, sensitive, or private information such as customer identities, bank or customer account numbers, account balances, or other information.

In some examples, one or more of user workflow data 106, configuration data 108, or data 110 accessed by the software application are not received by data module 104. Data received via data module 104 can be stored in data store 112. User workflow data 106, configuration data 108, and data 110 accessed by the software application can be received by data module 104 in response to detection of an execution error by the computer system providing the data. For example, upon detecting an execution error, the computer system can provide a visual or auditory prompt for the user to allow some or all of user workflow data 106, configuration data 108, or data 110 accessed by the software application to be sent to system 102 so that the execution error can be replicated and analyzed.

Simulation engine 114 reproduces an execution error by configuring a simulation environment based at least in part on the software application in which the execution error occurred and at least one of configuration data 108 or data 110 accessed by the software application prior to the execution error. For example, server computer 100 and simulation engine 114 can be configured to run a variety of software applications, replicate various configurations, and provide various data. This can be done, for example, through simulation software or through creation of a virtual machine that replicates the computer system from which data is received through data module 104.

Using the configured simulation environment, simulation engine 114 performs the plurality of method calls from the user workflow data to replicate the execution error. While the execution error may not always be replicated by using the simulation environment, the likelihood of replicating the execution error is much higher than if the simulation environment had not been configured using the configuration data 108 and the data 110 accessed by the software application.

An analysis module 116 determines a cause or a candidate cause of the execution error based on the performance of the plurality of method calls by simulation engine 114. Analysis module 116 can identify a portion of code in the software application that corresponds to the execution error. For example, the portion of code can be a location of a coding error or a location of a function that does not execute properly with certain data or configurations.

Analysis module 116 can consider a variety of data in determining a cause or a candidate cause of the execution error. For example, analysis module 116 can consider the additional method call that called the method call. An additional method call that called the method call in user workflow data 106 provides additional context that can be used by analysis module 116 in determining which of multiple possible paths a user followed to reach certain functionality or in analyzing the cause of an execution error. For example, data indicating that execution errors tend to occur when a method is called by a first additional method but not when the method is called by a second additional method can indicate that the first additional method or the interaction between the method and the first additional method should be investigated. In contrast, a simple identification of a method call that occurred prior to an execution error provides no additional insight into the cause of the execution error. As another example, even if not the cause or candidate cause of an execution error, data indicating that a method is frequently called by an additional method may indicate that users are performing two or more functions to reach one end goal. A software producer or software producer system can then combine functionality to make the software application simpler to use.

Analysis module 116 can also consider configuration data 108. The execution of a software application can be affected by factors such as the above examples of configuration data 108, and this information provides additional context to a software producer or software producer system in analyzing errors or updating code. Data 110 accessed by the software application can similarly provide additional context. This information can be used to determine whether an execution error was, for example, the result of a function that is incorrectly coded regardless of the data 110 accessed by the software application or whether the occurrence of an execution error is related to the size, type, or other characteristic of the data 110.

Figure 2:
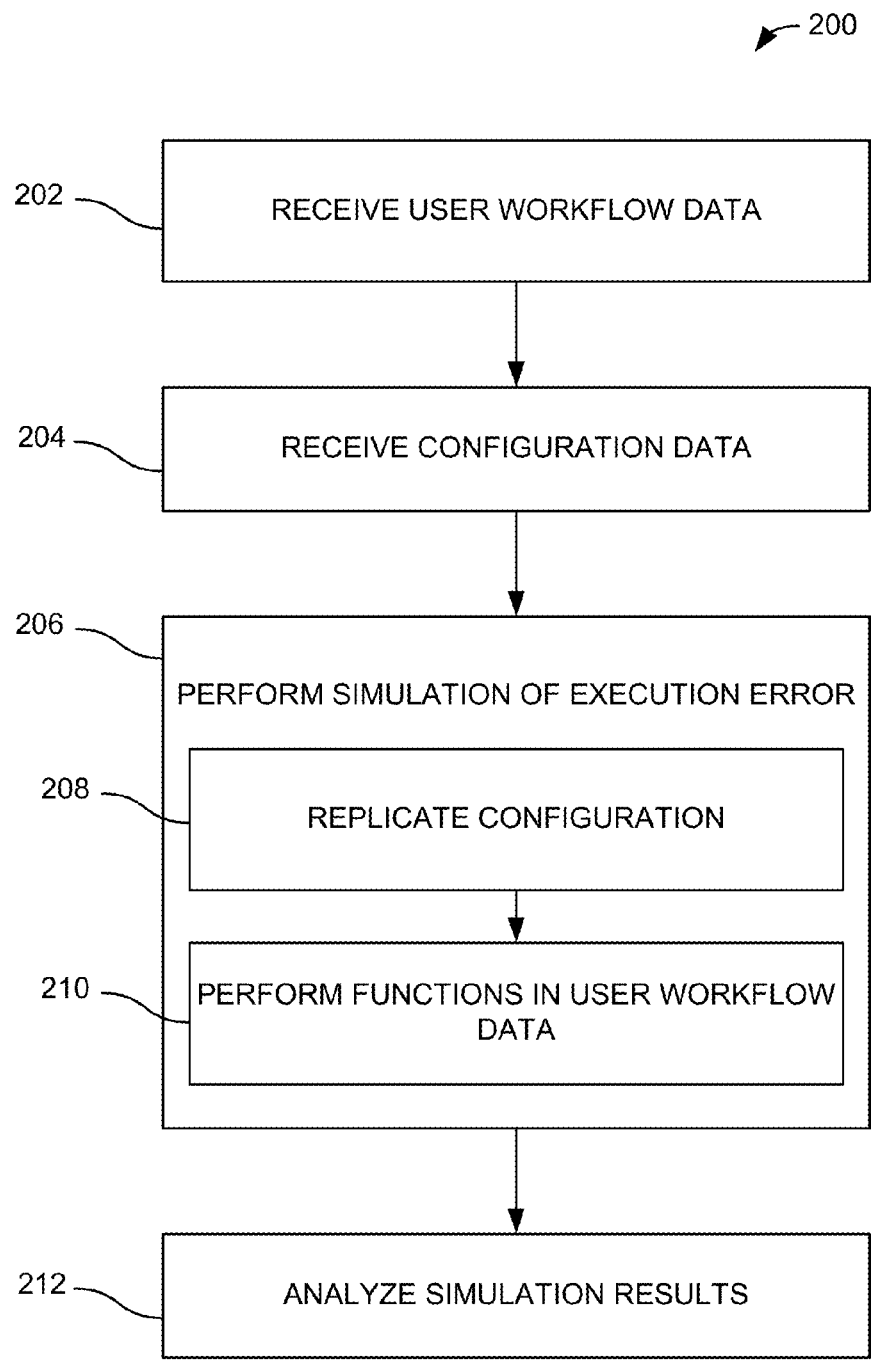
FIG. 2 illustrates an example method of replicating a user workflow.

FIG. 2 illustrates an example method 200 of replicating a user workflow. In process block 202, user workflow data representing one or more user interactions with a software application executed by a computer system is received. In process block 204, configuration data is received for at least one of the software application or the computer system. In some examples, data accessed by the software application prior to the detection of the execution error is also received. The user workflow data and the configuration data are received in response to a detection of an execution error in the software application.

A simulation of the execution error is performed in process block 206. The simulation is performed through sub-process blocks 208 and 210. In sub-process block 208, a configuration of the software application and/or the computer system is replicated based at least in part on the configuration data. The replication of the configuration can also be based on data that was accessed by the software application prior to the detection of the execution error. In sub-process block 210, one or more functions specified in the user workflow data are performed. The results of the simulation of the execution error are analyzed in process block 212. The analysis in process block 212 can be, for example, similar to the analysis described with reference to analysis module 116 of FIG. 1 and analysis module 312 of FIG. 3.

Figure 3:
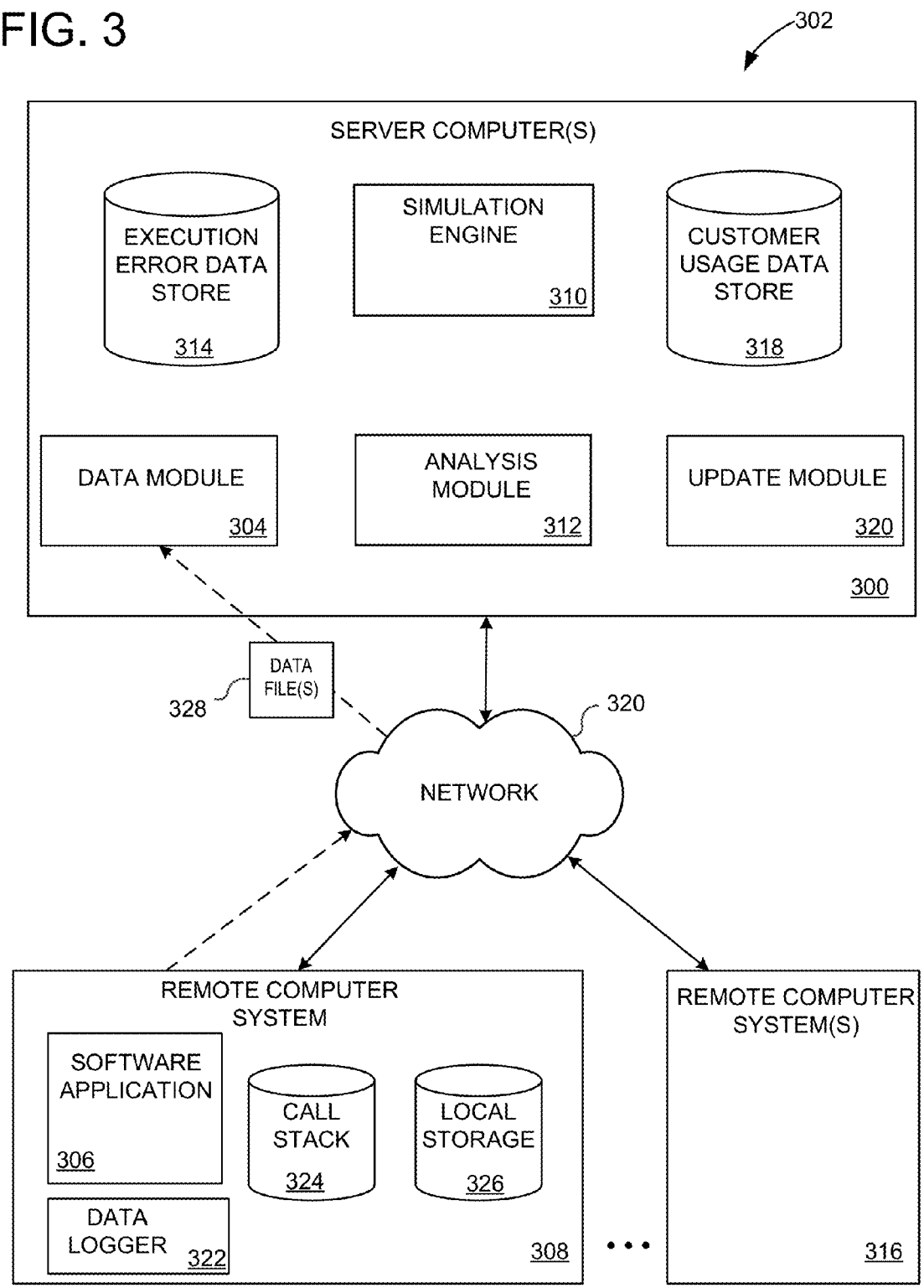
FIG. 3 is an example user workflow replication system showing interaction with remote computer systems.

FIG. 3 illustrates one or more server computers 300 implementing a user workflow replication system 302. System 302 includes a data module 304 that receives data associated with an execution error in a software application 306 executed by a remote computer system 308. System 302 also includes simulation engine 310 and analysis module 312. Data module 304, simulation engine 310, and analysis module 312 can be similar to the corresponding components of system 102 in FIG. 1.

Execution error data store 314 stores execution errors or references to execution errors that were detected in software application 306 when software application 306 was executed by other computer systems, such as remote computer system(s) 316. Execution error data store 314 can also store portions of code or references to portions of code corresponding to the detected execution errors. As used herein, instances of software application 306 installed on other computer systems are referred to as software application 306. Execution error data store 314 can be searched to determine the number of referenced execution errors that are stored that correspond to the portion of code in which the execution error in software application 306 was detected. In this way, a likelihood can be determined that the execution error for which a simulation was performed is a result of a code error in the corresponding portion of code.

For example, if analysis module 312 determines that an execution error corresponds to a certain portion of code, execution error data store 314 can be searched to determine if other execution errors have been determined to correspond to that portion of code. The greater the number of execution errors that have been detected for the portion of code, the more likely it is that the execution errors are a result of a coding error. Conversely, if very few execution errors have been found to correspond to that portion of code, the cause of the current execution error may lie elsewhere. In some examples, execution error data store 314 can be used to create a heat map of different portions of code in which portions of code for which a high number of execution errors have been detected are shown in one color (e.g. red) and portions of code for which a low number of execution errors have been detected are shown in a different color (e.g. green)

and a color gradient is used to represent intermediate numbers of detected errors. Such a heat map can be used by analysis module 312 and can also be presented as a visual tool for customer support engineers diagnosing current execution errors.

In some examples, execution error data store 314 stores a ranking, for example a 0.00-1.00, 1-10, 1-100, or other ranking (e.g., low-high), of error incidence for code portions such that when execution error data store 314 is searched for a code portion, a numerical ranking is returned that indicates how common errors are for that code portion. This information can be used to determine whether a detected execution error is likely caused by the code portion corresponding to the error or whether another factor is likely responsible.

Customer usage data store 318 contains user workflow data and configuration data for other remote computer systems that have executed the software application. An update module 320 can access customer usage data store 318, identify one or more usage patterns based on the user workflow data, and determine an update for software application 306 based on the one or more usage patterns. For example, based at least in part on customer usage data store 318, it can be determined that the use of one or more functions of software application 306 is below a predetermined frequency of use threshold for function removal. The frequency of use threshold can be a percentage, number, or other metric and can be fixed or user-defined to conform to customer needs. Update module 320 can then provide an update for software application 306 to at least some of: remote computer system 308 and remote computer systems 316 that are also executing software application 306. The update for software application 306 hides or removes functionality determined to be below the predetermined frequency of use threshold for function removal. In some examples, software application 306 provides functionality to accept or reject updates and has functionality to undo and add back any automatically removed functionality.

In another example, based at least in part on customer usage data store 318, update module 320 can determine that a sequence of two or more method calls or a sequence of two or more user interface interactions are performed more often than a predetermined frequency of use threshold for shortcut creation. The predetermined frequency of use threshold for shortcut creation can be a percentage, number, or other metric and can be fixed or user-defined to conform to customer needs. Update module 320 can create a shortcut combining the functionality of the sequence of two or more method calls or the sequence of two or more user interface interactions. The shortcut can be provided as an update by update module 320 to at least some computer systems executing software application 306.

Server computers 300 are in communication with remote computer system 308 and remote computer systems 316 via network 320. Network 320 can be the Internet, a local area network (LAN), a wireless local area network (WLAN), a wide area network (WAN), or other type of network, wired or wireless. Remote computer system 308 includes data logger 322 that transfers method calls logged in call stack 324 to local storage 326 or maintains the method calls in call stack 324. Call stack 324 and local storage 326 can have a variety of formats, including a database or list format. A method call that called a method call can also be stored in association with method calls in call stack 324 and/or in local storage 326. The time between user interactions with different functions of software application 306 can also be recorded in either call stack 324 or local storage 326. This information can be used to infer user intent. For example, if data logger 322 records three interactions with software application 306 within five seconds of each other, it can be inferred that the interactions were part of a single action. Data logger 322 can control the logging of data from multiple different software applications.

Data received by data module 304, including user workflow data, configuration data, and data accessed by software application 306 prior to detection of an execution error (which can include data stored in call stack 324 and/or local storage 326) can be packaged into a single file or streaming container. This is illustrated in FIG. 3 by data file(s) 328, shown with a dotted line as being transmitted from remote computer system 308, through network 320, to data module 304. Data file(s) 328 can be, for example, a structured XML or other file type.

Figure 4:
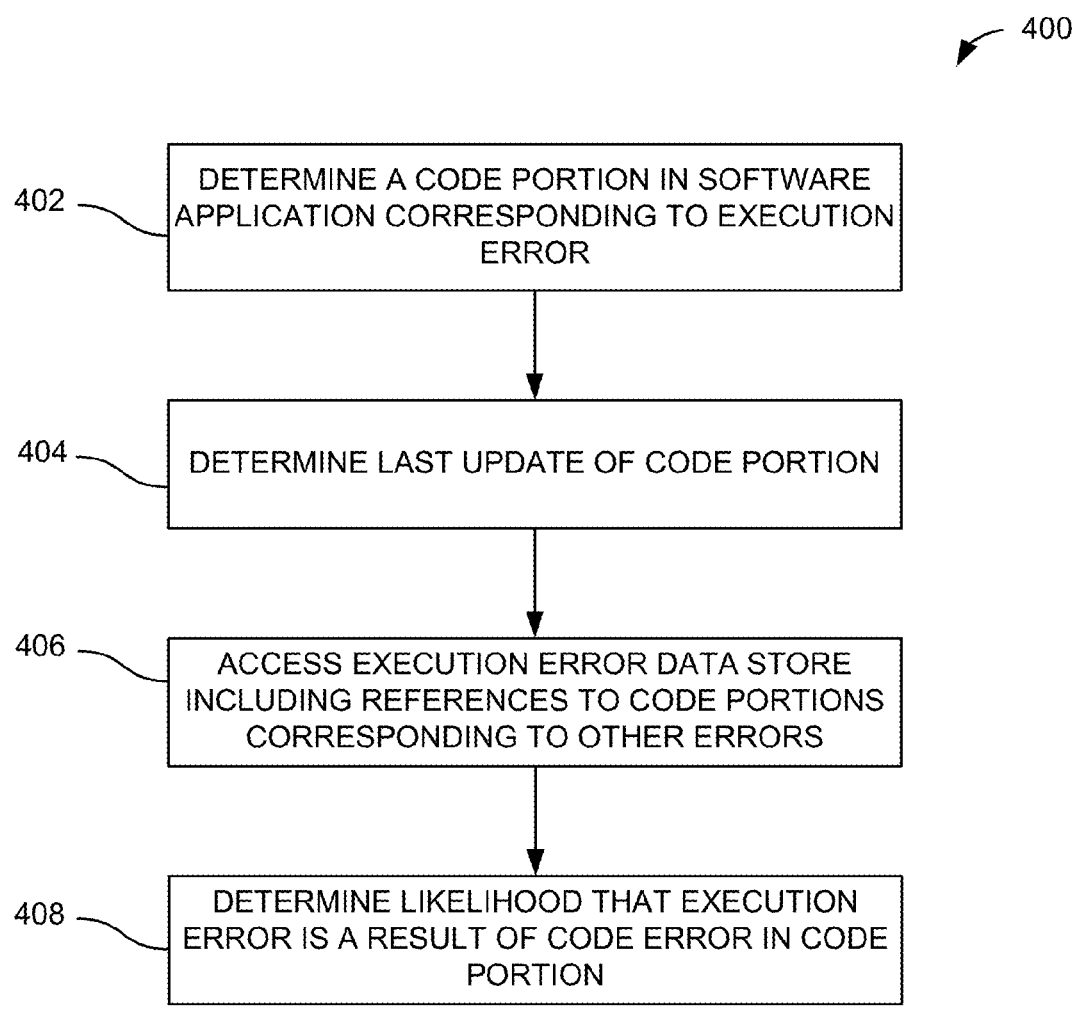
FIG. 4 is an example method of analyzing results of a simulation of an execution error.

FIG. 4 illustrates a method 400 of analyzing results of a simulation of an execution error. In process block 402, a portion of code in the software application corresponding to the execution error is determined. In process block 404, a date when the portion of code was last updated is determined. A data store storing references to execution errors detected in the software application by other computer systems and portions of code corresponding to the execution errors is accessed in process block 406.

Based at least in part on the date when the portion of code was last updated and a number of execution errors in the data store corresponding to the portion of code, a likelihood that the execution error for which the simulation was performed is a result of a code error in the portion of code is determined in process block 408. For example, the fewer execution errors in the data store that correspond to the portion of code corresponding to the current execution error, the less likely it is that the portion of code is likely to be the source of the execution error. As another example, if a portion of code has not been updated recently, and few other errors are associated with that portion of code, it is likely that the portion of code is not the cause (or at least the sole cause) of the execution error. In contrast, if few errors are associated with a portion of code prior to a software update, and after the update a larger number or percentage of errors are associated with the portion of code, at least a part of the cause of the current execution error likely is a result of the updated code.

Figure 5:
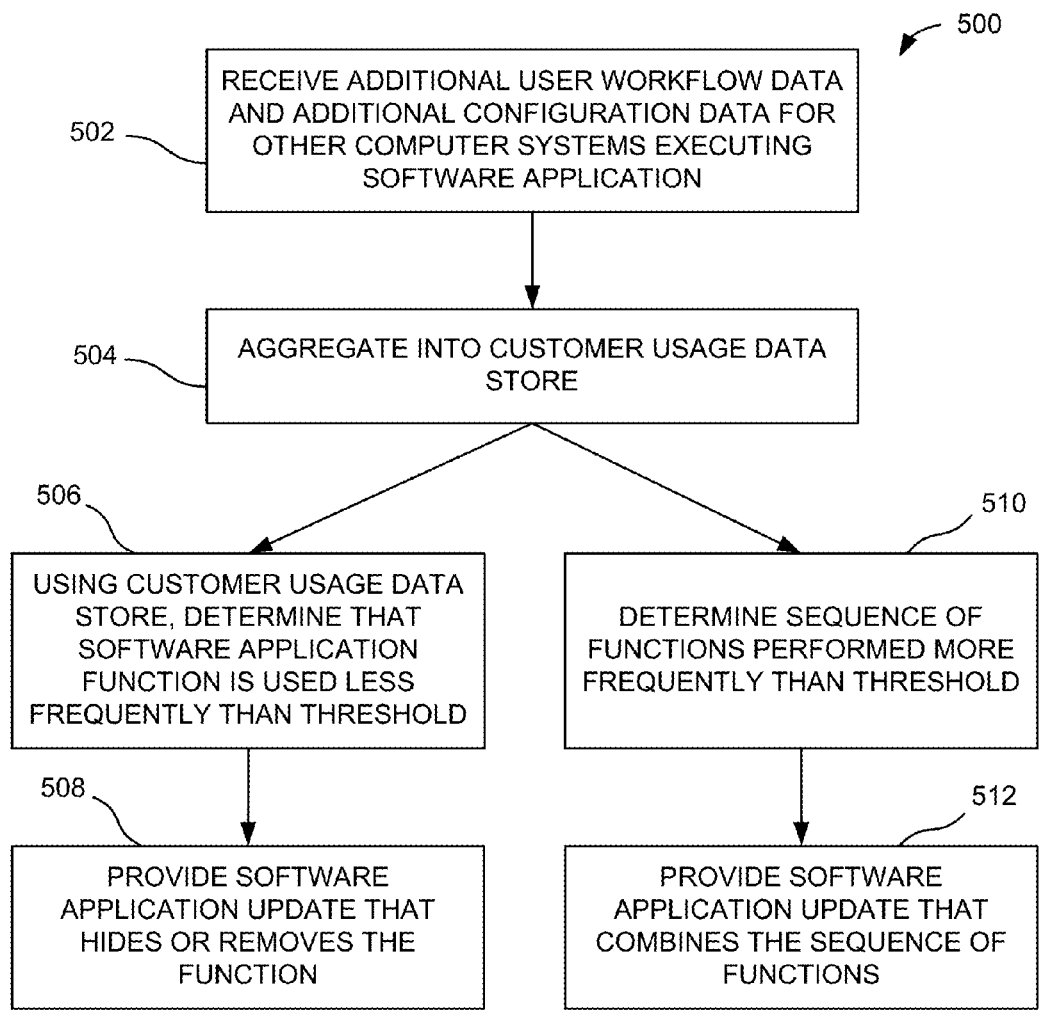
FIG. 5 is an example method of updating a software application in response to analysis of data in a customer usage data store.

FIG. 5 illustrates a method 500 of aggregating data from multiple computer systems into a customer usage data store and using the information to update a software application. In process block 502, additional user workflow data and additional configuration data is received for additional computer systems that have executed the software application. In process block 504, at least some of the additional user workflow data and configuration data is aggregated into a customer usage data store for the software application. The customer usage data store can be maintained, for example, in the system of a software producer, and the data received from different computer systems can be data from different corporate or individual customers. The customer usage data store can thus represent a summary of how customers use a software application. In process block 506, based at least in part on the customer usage data store, it is determined that the use of one or more functions of the software application are below a predetermined frequency of use threshold for function removal. In process block 508, an update for the software application is provided to at least some of: the computer system executing the software application and the additional computer systems executing the software application. The update for the software application hides or removes functionality determined to be below the predetermined frequency of use threshold for function removal.

Alternatively or additionally, process blocks 510 and 512 can be performed using the customer usage data store. In process block 510, it is determined that a sequence of two or more method calls or a sequence of two or more user interface interactions is performed more often than a predetermined frequency of use threshold for shortcut creation. An update for the software application can then be provided to computer systems that have executed the software application. The update can include a shortcut combining the functionality of the sequence of two or more method calls or the sequence of two or more user interface interactions.

Figure 6:
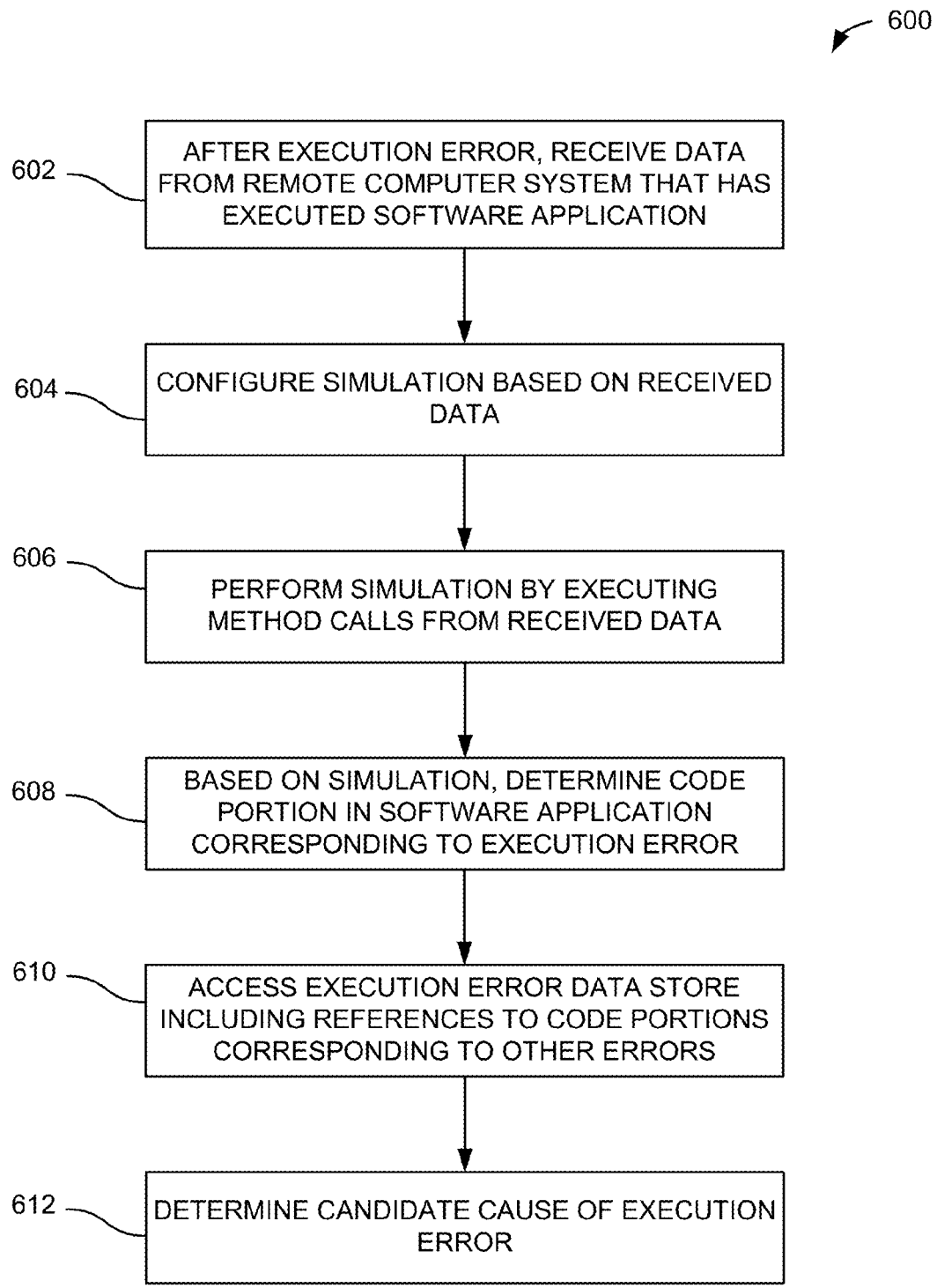
FIG. 6 is an example method of replicating a user workflow in which results of a simulation and a data store of other execution errors are used to determine a candidate cause of execution error.

FIG. 6 illustrates a method of replicating a user workflow at one or more server computers. In process block 602, data from a remote computer system that has executed a software application is received. The data is provided by the remote computer system after an execution error in the software application is detected. In some examples, upon detection of an execution error, a prompt is provided requesting permission to share the data with the one or more server computers. The data can comprise user workflow data, configuration data, and data accessed by the software application prior to detection of the execution error. User workflow data comprises a plurality of method calls representing functions performed by the software application prior to detection of the execution error. For at least some of the respective method calls of the plurality of method calls, an associated method call that called the method call can also be included in the user workflow data.

In process block 604, a simulation is configured based at least in part on the software application, the configuration data, and the data accessed by the software application prior to detection of the execution error. In process block 606, the simulation is performed by executing at least some of the plurality of method calls in the user workflow. Based at least in part on the simulation, a portion of code in the software application that corresponds to the execution error is determined in process block 608. In process block 610, a data store is accessed, the data store containing execution errors in the software application detected in other remote computer systems and references to portions of code corresponding to the execution errors. In process block 612, a candidate cause of the execution error is determined based at least in part on at least one of the portion of code in the software application that corresponds to the execution error, the portions of code corresponding to the execution errors in the data store, or the associated method call that called the method call.

Examples of Implementation Environments

Figure 7:
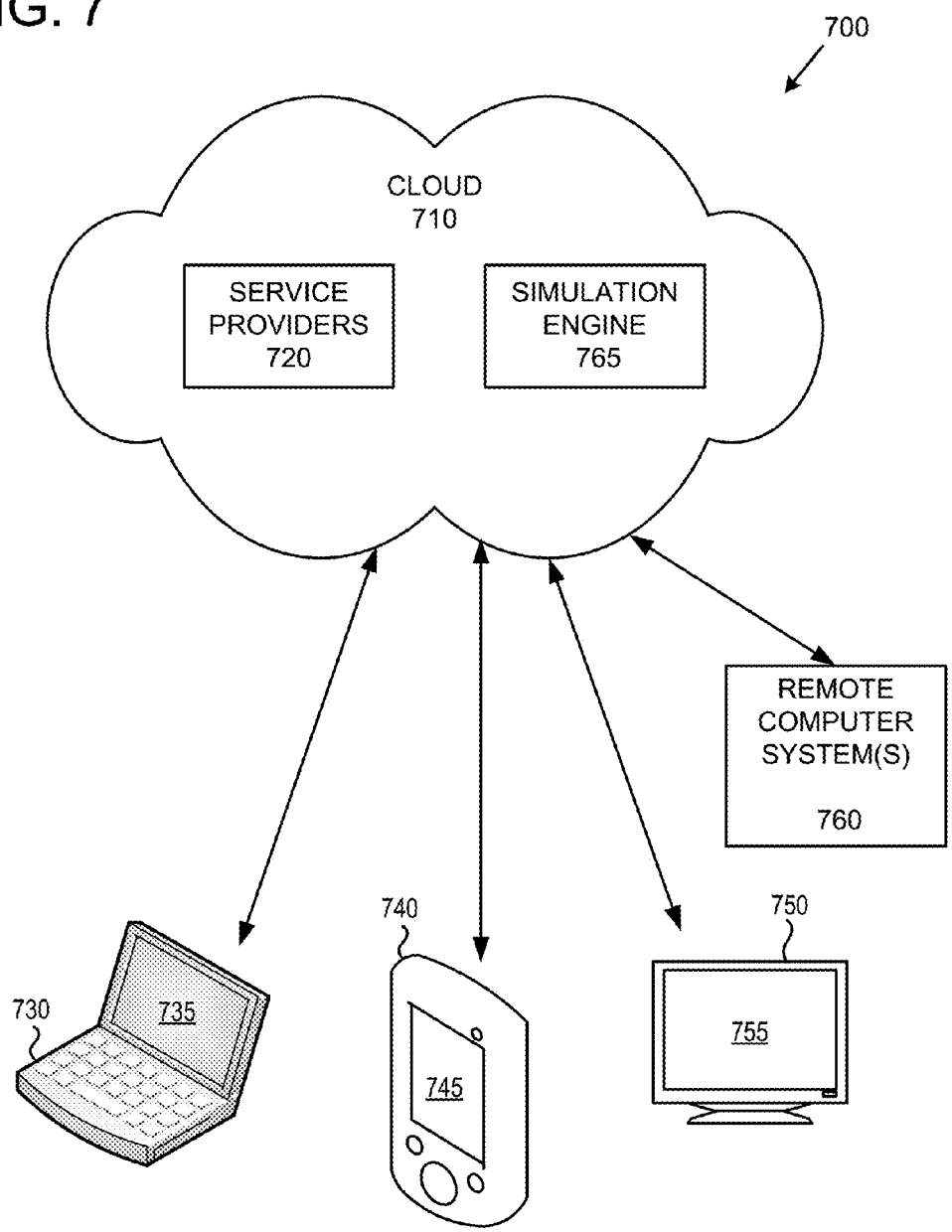
FIG. 7 is a diagram illustrating a generalized implementation environment in which some described examples can be implemented.

FIG. 7 illustrates a generalized example of a suitable implementation environment 700 in which described embodiments, techniques, and technologies may be implemented. In example environment 700, various types of services (e.g., computing services) are provided by a cloud 710. For example, the cloud 710 can comprise a collection of computing devices, which may be located centrally or distributed, that provide cloud-based services to various types of users and devices connected via a network such as the Internet. The implementation environment 700 can be used in different ways to accomplish computing tasks. For example, some tasks (e.g., processing user input and presenting a user interface) can be performed on local computing devices (e.g., connected devices 730, 740, 750) while other tasks (e.g., storage of data to be used in subsequent processing) can be performed in the cloud 710.

In example environment 700, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, or the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touchscreen capabilities. Touchscreens can accept input in different ways. For example, capacitive touchscreens detect touch input when an object a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touchscreen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users). Cloud 710 can store components similar to the components of systems 102 of FIG. 1 and 302 of FIG. 3, such as simulation engine 765.

Examples of Computing Environments

Figure 8:
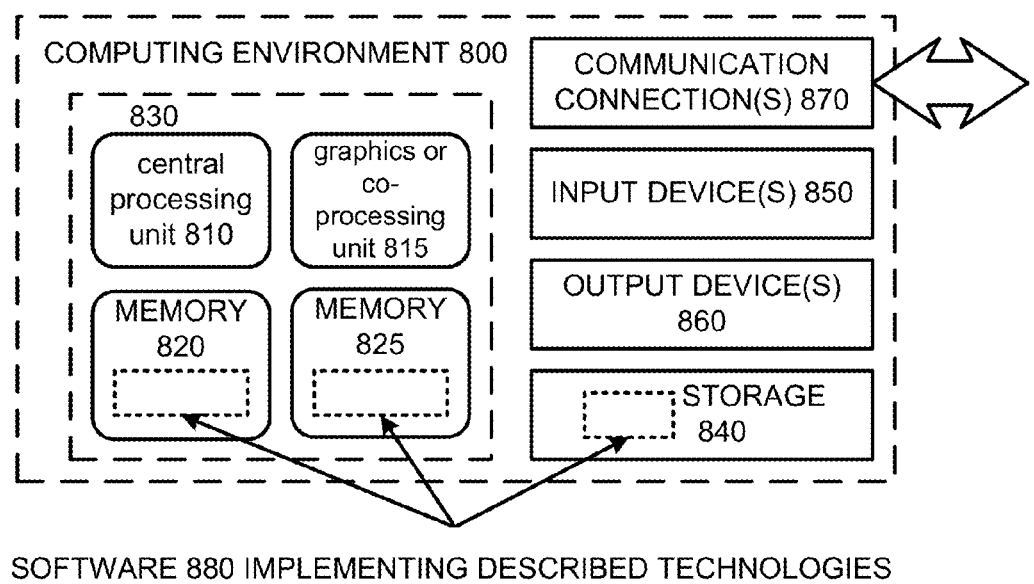
FIG. 8 is a diagram illustrating a generalized example of a suitable computing environment with which some described examples can be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 and software 880 can store computer-executable instructions for replicating user workflows as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more computer-readable storage media storing instructions that, when executed by a computing device, perform a method of replicating a user workflow, the method comprising:
   receiving user workflow data representing one or more user interactions with a software application executed by a computer system;
   receiving configuration data for at least one of the software application or the computer system, wherein the user workflow data and the configuration data are received in response to a detection of an execution error in the software application;
   performing a simulation of the execution error by:
      based on the configuration data, replicating a configuration of the at least one of the software application or the computer system; and
      performing one or more functions specified in the user workflow data; and
   analyzing results of the simulation of the execution error, wherein analyzing the results of the simulation of the execution error comprises:
      determining a portion of code in the software application corresponding to the execution error;
      determining a date when the portion of code was updated;
      accessing an execution error data store storing references to other execution errors detected in the software application by other computer systems and references to portions of code corresponding to the other execution errors; and
      based at least in part on the date when the portion of code was updated or a number of other execution errors in the data store corresponding to the portion of code, determining a likelihood that the execution error for which the simulation was performed is a result of a code error in the portion of code.

2. The computer-readable storage media of claim 1, further comprising:
   receiving additional user workflow data and additional configuration data for additional computer systems that have executed the software application; and
   aggregating at least some of the additional user workflow data and configuration data into a customer usage data store for the software application.

3. The computer-readable storage media of claim 2, further comprising based at least in part on the customer usage data store, determining that the use of one or more functions of the software application are below a predetermined frequency of use threshold for function removal.

4. The computer-readable storage media of claim 3, further comprising providing an update for the software application to at least some of: the computer system executing the software application and the additional computer systems executing the software application, wherein the update for the software application hides or removes functionality determined to be below the predetermined frequency of use threshold for function removal.

5. The computer-readable storage media of claim 2, further comprising:
   based at least in part on the customer usage data store, determining that a sequence of two or more method calls or a sequence of two or more user interface interactions is performed more often than a predetermined frequency of use threshold for shortcut creation;
   creating a shortcut combining the functionality of the sequence of two or more method calls or the sequence of two or more user interface interactions; and
   providing an update for the software application to at least some of the computer system executing the software application and the additional computer systems executing the software application, the update including the shortcut.

6. The computer-readable storage media of claim 1, further comprising receiving data accessed by the software application prior to the detection of the execution error, and wherein the data accessed by the software application is used in the simulation of the execution error.

7. The computer-readable storage media of claim 1, wherein the user workflow data comprises a plurality of method calls logged in a call stack of the computer system, wherein the method calls correspond to functions performed by the software application prior to the execution error, and wherein the method calls are logged in a time-ordered sequence.

8. The computer-readable storage media of claim 7, wherein the user workflow data further comprises, for at least one of the plurality of method calls, an additional method call that called the method call, wherein the method call and the additional method call that called the method call are stored in association in the call stack of the computer system, and wherein the analyzing results of the simulation of the execution error is based at least in part on the additional method call that called the method call.

9. The computer-readable storage media of claim 1, wherein the user workflow data comprises a list of user interface interactions.

10. The computer-readable storage media of claim 1, wherein the configuration data includes at least one of: a software application customization, a software application version, a software application setting, an operating system support pack version, an operating system version, or a hardware configuration of the computer system.

11. The computer-readable storage media of claim 1, wherein the user workflow data and the configuration data are received as an XML file.

12. One or more server computers implementing a user workflow replication system, the system comprising:
   a data module configured to receive data associated with a remote computer system, the data associated with an execution error in a software application executed by the remote computer system, the data comprising:
      user workflow data comprising a plurality of method calls logged in a call stack of the remote computer system, wherein the method calls correspond to functions performed by the software application prior to the execution error, and wherein the method calls are logged in a time-ordered sequence;
      configuration data for at least one of the software application or the remote computer system; and
      data accessed by the software application prior to the execution error;
   a simulation engine configured to reproduce the execution error by:
      configuring a simulation environment based at least in part on the software application, the configuration data, and the data accessed by the software application prior to the execution error; and using the simulation environment, performing the plurality of method calls from the user workflow data; and an analysis module configured to determine a cause of the execution error based on the performance of the plurality of method calls by the simulation engine.

13. The one or more server computers of claim 12, wherein the analysis module is further configured to identify a portion of code in the software application corresponding to the execution error.

14. The one or more server computers of claim 13, wherein the analysis module is further configured to access an execution error data store to determine a number of execution errors corresponding to the portion of code detected by other remote computer systems that have executed the software application.

15. The one or more server computers of claim 12, wherein the system further comprises:

a customer usage data store containing user workflow data and configuration data for other remote computer systems that have executed the software application; and an update module configured to identify one or more usage patterns based on the user workflow data in the customer usage database and determine an update for the software application based on the one or more usage patterns.

16. A method of replicating a user workflow, the method comprising:

at one or more server computers:

receiving data from a remote computer system that has executed a software application, the data provided by the remote computer system after an execution error in the software application is detected, the data comprising:

user workflow data comprising a plurality of method calls representing functions performed by the software application prior to detection of the execution error and, for at least some of the respective method calls of the plurality of method calls, an associated method call that called the method call, wherein the method calls are logged in a time-ordered sequence in a call stack of the remote computer system;

configuration data for at least one of the software application or the remote computer system; and data accessed by the software application prior to detection of the execution error;

configuring a simulation based at least in part on the software application, the configuration data, and the data accessed by the software application prior to detection of the execution error;

performing the simulation by executing at least some of the plurality of method calls in the user workflow;

based at least in part on the simulation, determining a portion of code in the software application that corresponds to the execution error;

accessing a data store containing references to execution errors in the software application detected in other remote computer systems and references to portions of code corresponding to the execution errors; and determining a candidate cause of the execution error based at least in part on at least one of the portion of code in the software application that corresponds to the execution error, the portions of code corresponding to the execution errors in the data store, or the associated method call that called the method call.

17. The method of claim 16, further comprising:

receiving additional user workflow data and additional configuration data for additional remote computer systems that have executed the software application; and aggregating at least some of the additional user workflow data and configuration data into a customer usage data store for the software application.

18. The method of claim 17, further comprising:

based at least in part on the customer usage data store, determining that the use of one or more functions of the software application are below a predetermined frequency of use threshold for function removal; and providing an update for the software application, wherein the update hides or removes functionality determined to be below the predetermined frequency of use threshold for function removal.

19. The method of claim 17, further comprising based at least in part on the customer usage data store, determining that a sequence of two or more method calls is performed more often than a predetermined frequency of use threshold for shortcut creation; and providing an update for the software application, wherein the update includes a shortcut combining the functionality of the sequence of two or more method calls.

20. One or more computer-readable storage media storing instructions that, when executed by a computing device, perform a method of replicating a user workflow, the method comprising:

receiving user workflow data representing one or more user interactions with a software application executed by a computer system;

receiving configuration data for at least one of the software application or the computer system, wherein the user workflow data and the configuration data are received in response to a detection of an execution error in the software application;

performing a simulation of the execution error by:

based on the configuration data, replicating a configuration of the at least one of the software application or the computer system; and performing one or more functions specified in the user workflow data;

analyzing results of the simulation of the execution error;

identifying one or more usage patterns based on user workflow data for other computer systems; and based on the one or more usage patterns, determining an update for the software application.

21. The computer-readable storage media of claim 20, wherein determining the update comprises at least one of creating a shortcut combining multiple actions indicated by the one or more usage patterns or hiding or removing functionality indicated by the one or more usage patterns as being used less frequently than a function removal threshold.

* * * * *